United States Patent [19]

Fork

[11] 4,380,417

[45] Apr. 19, 1983

[54] INSTALLATION OPERATED WITH WIND OR WATER POWER

[75] Inventor: Werner Fork, Heidenheim, Fed. Rep. of Germany

[73] Assignee: J. M. Voith GmbH, Heidenheim, Fed. Rep. of Germany

[21] Appl. No.: 165,274

[22] Filed: Jul. 2, 1980

[30] Foreign Application Priority Data

Jul. 11, 1979 [DE] Fed. Rep. of Germany ....... 2927956

[51] Int. Cl.³ .............................................. F03D 7/06
[52] U.S. Cl. .................................... 416/108; 416/111
[58] Field of Search .......... 416/111 R, 111 A, 112 A, 416/108, 17

[56] References Cited

U.S. PATENT DOCUMENTS

| 2,003 | 3/1841 | Van Osdel | 416/111 |
|---|---|---|---|
| 441,461 | 11/1890 | Avet | 416/111 |
| 1,618,549 | 2/1927 | O'Toole | 416/111 |
| 1,636,423 | 7/1927 | Langenbach | 416/111 |
| 1,964,347 | 6/1934 | Ford | 416/111 X |
| 2,291,062 | 7/1942 | Schneider | 416/111 A X |
| 3,241,618 | 3/1966 | Baer | 416/111 A X |
| 3,382,931 | 5/1968 | DeJussieu-Pontcarrel et al. | 416/111 A X |

FOREIGN PATENT DOCUMENTS

| 742788 | 12/1943 | Fed. Rep. of Germany | 416/17 |
|---|---|---|---|
| 860466 | 12/1952 | Fed. Rep. of Germany | 416/111 A |
| 757069 | 2/1953 | Fed. Rep. of Germany | 416/111 A |
| 2826180 | 12/1979 | Fed. Rep. of Germany | 416/111 |
| 62863 | 8/1940 | Norway | 416/111 A |
| 297803 | 8/1929 | United Kingdom | 416/111 A |

*Primary Examiner*—Everette A. Powell, Jr.
*Attorney, Agent, or Firm*—Albert L. Jeffers; John F. Hoffman

[57] ABSTRACT

An installation for extracting useful work, such as driving an electric generator from a fluid stream, includes a platform rotatable about a central axis and supporting a plurality of blades or vanes, each of which is rotatable about its individual blade axis to vary the angle of attack between the blades and the fluid stream during each revolution of the platform. The blades are coupled together so that each blade executes a similar motion during each platform revolution and so that the angle of attack of the fluid stream relative to a given blade is substantially zero when the fluid stream direction is perpendicular to the plane including the central platform axis and the axis of the given blade, the amount of variation in blade angle of attack during each revolution is variable to compensate for variations in the fluid flow.

9 Claims, 6 Drawing Figures

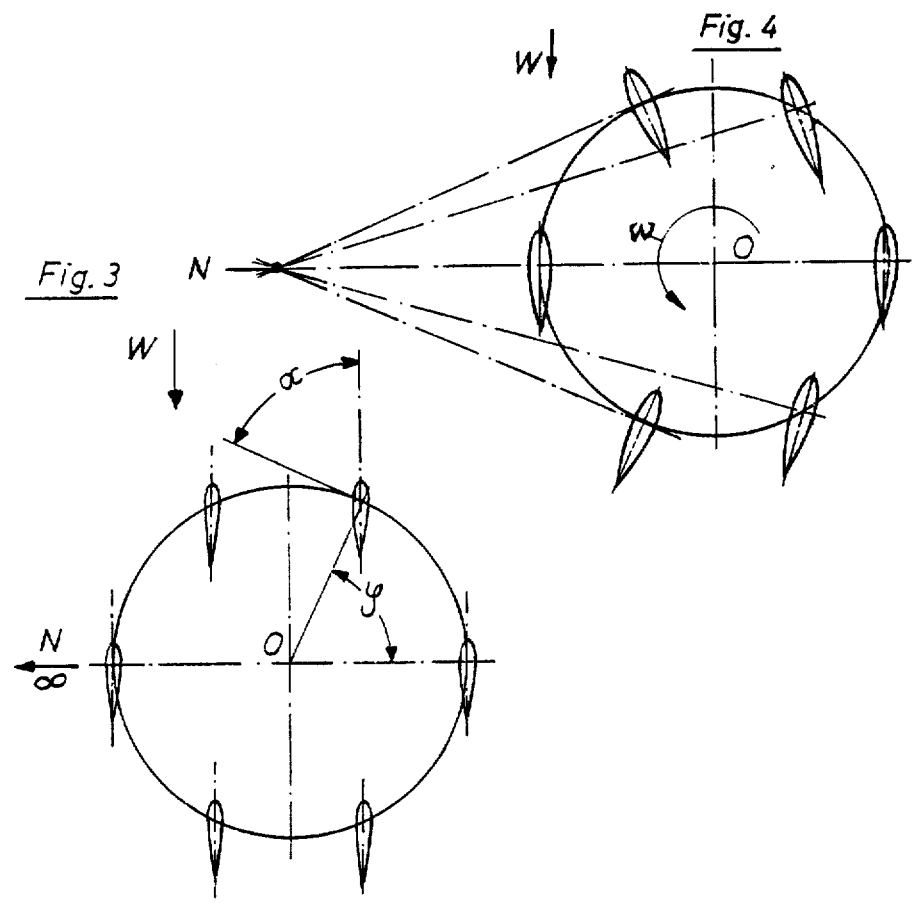

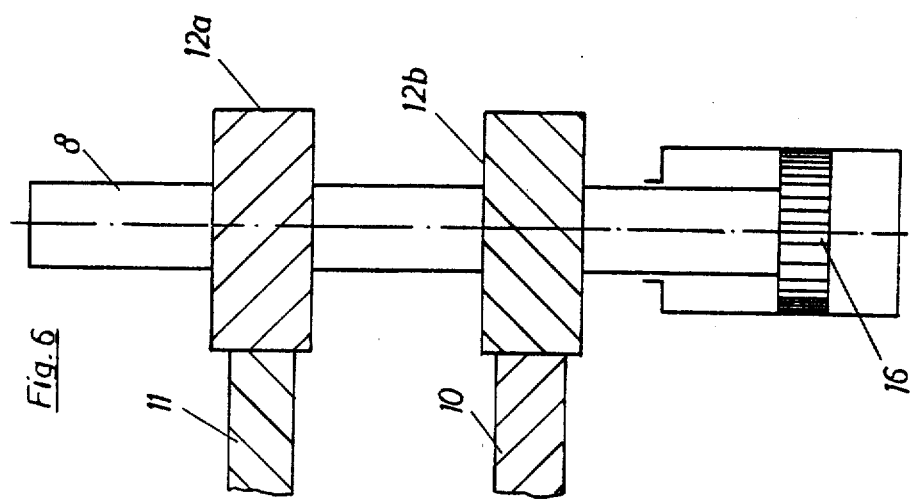
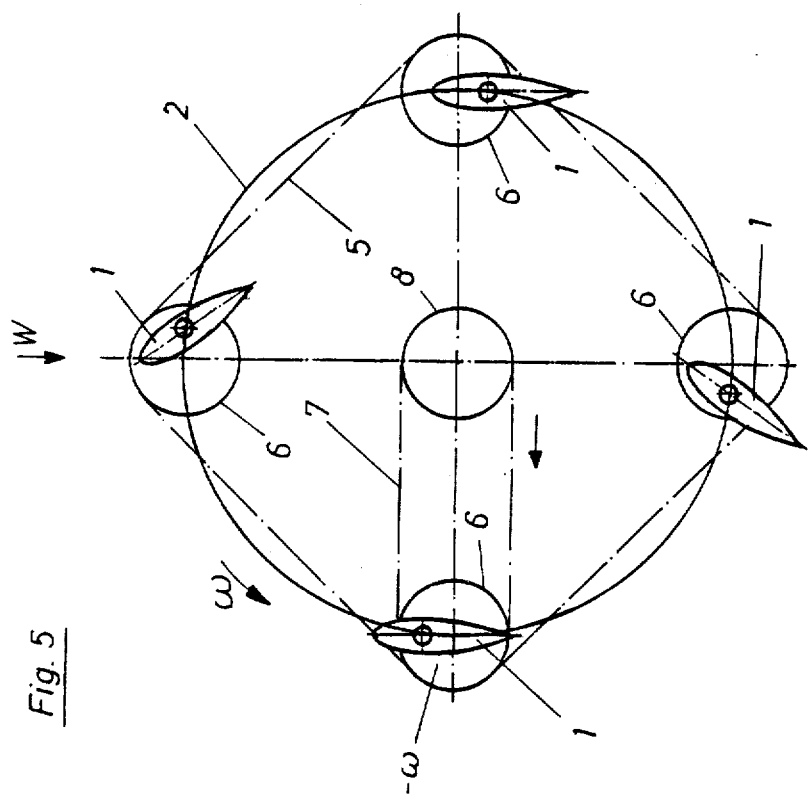

INSTALLATION OPERATED WITH WIND OR WATER POWER

BACKGROUND OF THE INVENTION

The present invention relates generally to wind, water or other fluid stream actuated devices, and more particularly to such devices employing a plurality of blades or vanes, each movable about its respective axis, and with the several blade axes distributed about and parallel to the central axis of a wheel which supports the several vanes. Even more particularly, the present invention is concerned with such a fluid stream actuated device wherein the vanes exhibit tilting or oscillatory motions about their axes during each revolution of the support wheel about its axis.

It is known generally in the prior art, as illustrated by the so-called cycloid ship propeller and West German Patent No. 742,788 to movably support blades on a wheel body so that when wind is blowing, aerodynamic buoyancy forces or lift occurs at the blades, causing the wheel body to rotate, and thereby deriving energy from the fluid flow. Such arrangements may be adjusted to any wind direction.

However, this known arrangement for exploiting wind power has the disadvantage that several blades are positioned transversely to the direction of the wind, bringing with it the risk that during a storm with very high wind velocities, the blades may break. An additional disadvantage is that due to the fixed position of the blades, the RPM of the wheel body may be controlled only within very narrow limits.

Installations which exploit the power of flowing water are generally constructed to be actuated by one certain flow under optimum conditions, that is, the direction the fall head and other parameters of fluid flow must be just right, and if any changes in these parameters occur, the installation becomes completely ineffective or performs at a substantially reduced efficiency.

SUMMARY OF THE INVENTION

Among the several objects of the present invention may be noted the provision of a device for harnessing the energy of a fluid stream which is adaptable to wide variations in the fluid flow; the provision of a device in accordance with the previous object which is adaptable to changes in either strength or direction of flow; the provision of a wind or water actuated device which despite wide variation in the actuating force is capable of providing a controlled output as might, for example, be required for driving an alternating current generator at a closely controlled speed; the provision of a device for extracting energy from a naturally moving fluid wherein the likelihood of damage to the device during times of more violent fluid motion is reduced; and the provision of a fluid driven wheel, the movable vanes or blades of which execute an oscillatory motion rather than a rotary motion as the wheel revolves. These as well as other objects and advantageous features of the present invention will be in part apparent and in part pointed out hereinafter.

In general and in one form of the invention, a device for harnessing the energy of a fluid stream includes a platform or wheel rotatably supported on a central axis and in turn supporting a plurality of vanes or blades for rotation about respective vane axes generally parallel to and displaced from the central axis and an arrangement for synchronizing vane rotation about the respective vane axes relative to the platform rotation about the central axis so as to provide each vane with the same average angular velocity as the platform with however the angular velocity of each vane about its own axis at certain times exceeding and at other times being less than the platform angular velocity during each platform revolution. Typically, the angular velocity of a vane exceeds the angular velocity of the platform during about one-half of the platform revolution while lagging behind the platform angular velocity during the other half revolution. The amount of dissimilarity between vane and platform angular velocities is adjustably controllable.

Thus, according to the present invention, the problem of how to create an installation based on wind or water power, the blades of which can nicely become adjusted to the existing wind and streaming conditions at any time has been solved.

This problem was solved according to the presnt invention by making the profile axes or chords of the blades adjustable relative to the wind direction and during operation so that during one rotation of the wheel body or platform the blades execute angular deflections to alternate sides of the direction of fluid flow with the magnitude of these deflections being adjustable by the aid of an adjusting device. Thus, while the prior art blade arrangements rotate once during one rotation of the wheel body or platform, in a non-uniform manner about their respective axes, the blades according to the present invention are tilted out of their neutral position with respect to the wind or fluid flow direction to the left and to the right by a certain maximum angle relative to the fluid flow with the magnitude of the angular deflection being chosen according to the prevailing conditions, such as the strength of the wind or the stream flow. It is thereby possible to drive the platform at a preselected angular velocity, such as the synchronous speed needed for a generator. By employing the techniques of the present invention, it is also possible to generate within certain limits, a certain power which is not a function of the strength of the wind or of the flow. If the installation performs as a wind power plant, then in case of a storm, all the blades may be adjusted in parallel to the wind direction so that they offer a small surface of attack to the wind. If the installation according to the present invention is used to exploit water power, such as a flow of changing direction and magnitude like ocean currents, or tides, the adjustment of the blades is adaptable in a simple way to the direction and strength of the flow as they exist at any given time.

Once the principles of the present invention are understood, a variety of adjusting devices may be visualized for accomplishing the angular deflection of the blades. In addition to mechanical or hydraulic adjustment devices which operate either for each blade individually or which are coupled to each other for operating all of the vanes, one may also provide for example electrical adjustment arrangements. Thus, for example, each blade may be provided with a servomotor which, in conjunction with the necessary control devices, becomes correspondingly actuated during each rotation of the wheel. The coordination of the angular deflections of the individual vanes may also be accomplished with the interposition of a corresponding control device.

BRIEF DESCRIPTION OF THE DRAWING

FIGS. 3 and 4 are simplified top views of a device according to the present invention illustrating the positioning of the blades;

FIG. 5 is a plan view as from the top of FIG. 1, illustrating a device employing four blades; and FIG. 6 is an enlarged partial view illustrating the angular adjustment arrangement of the supporting disc or platform.

Corresponding reference characters indicate corresponding parts throughout the several views of the drawing.

Figure 1:
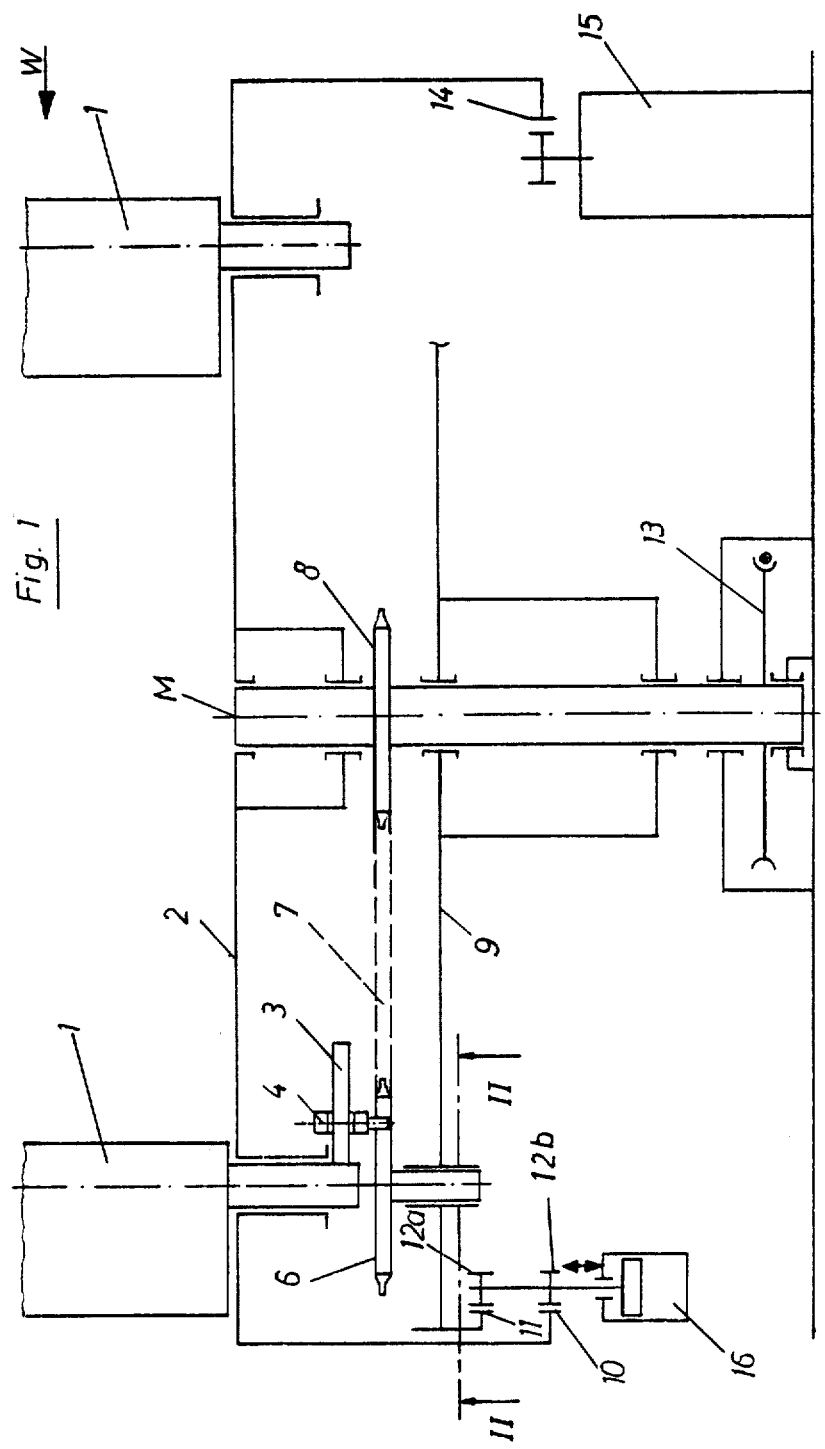
FIG. 1 is a somewhat schematic cross-section view of a device illustrating the principle of the present invention.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawing generally, the preferred blade motion according to the present invention is such that the perpendicular lines to the blade chords intersect the line perpendicular to the fluid flow direction and passing through the center of the blade rim or platform outside the circle described by the path of the blade axis.

This point of intersection of the perpendicular N lies on the line which passes through the center of the blade rim M perpendicular to the wind direction, as illustrated by the arrow W. The magnitude of the angular deflections of the blades depends on the distance of the point N from the center of the circular path. If point N is located at infinity, then all the blade profiles are oriented in parallel to the wind direction.

In one embodiment of the invention, the principle of a revolving crank slot is exploited in order to obtain the desired blade motion. In one specific embodiment, this is accomplished by providing a structure where:

(a) each blade 1 is driven with the interposition of a carrier peg or arm 3 and a crosshead or pivot link 4 by a connecting rod or coupler 6;

(b) the couplers of all blades are connected to each other by a belt or chain 5 or by gears or cogwheels or other similar arrangements;

(c) the couplers are positioned in a bearing disc or second platform 9 which is driven by a drive arrangement 10, 11 and 12 and which rotates synchronously with the wheel body or platform 2 inside which the blades are supported;

(d) the distance e of the points P at which the couplers 6 are supported from the axes of rotation K of the blades 1 is adjustable, for example by the structure illustrated in FIG. 6;

(e) a coupler of a blade with the interposition of a drive is directly or indirectly connected with a normally stationary central wheel 8 which may be turned by the action of a positioning drive 13 to properly orient the device to a given direction of fluid flow.

The blade motion with this arrangement is controllable as desired since each blade is provided with a kinematic drive employing a revolving crank slot in which the length of the crank e is adjustable. This means that the ratio which is so important for blade motion $a/e = \lambda =$ the pitch, where a is the coupler length or length between the coupler axis P and the axis of the pivot link 4 may be set all the way to infinity by letting e become zero. When $\lambda$ is infinite, the blades then receive a uniform rotary motion inside the wheel body with an angular velocity equal to the angular velocity of the platform but of opposite sign so that their absolute angular velocity is zero and their alignment remains that illustrated in FIG. 3.

By connecting the couplers 6 of the crank slots of all the blades together by a belt drive, chain drive or similar arrangement, the movement of each blade in a similar manner is accomplished. The magnitude of the angular deflections of the blades is determined by the distance e of the coupler support axes P from the axis of rotation K of the blade under consideration. If the supporting points P of the couplers and their corresponding blades axes K are located exactly above one another, then all of the blades are oriented in parallel. If the coupler bearing points are twisted in the peripheral direction relative to the blade axes, then the angle of incidence or attack of a blade with respect to the wind or water direction changes value during one revolution of the platform 2.

The stationary central wheel 8 functions to define the direction in which all the blades are oriented in parallel or around which they perform their angular deflection.

The couplers of the crank slots may, as noted earlier, be constructed as sprocket wheels, and in this manner the individual sprocket wheels may be connected to each other by a chain in a simple manner with one sprocket wheel connected directly to the central fixed sprocket and with the other sprocket wheels connected to one another.

There may also be provided a synchronous drive arrangement for connecting the wheel body or platform 2 and the bearing disc or second platform 9 together and this synchronous drive may comprise a pair of gears or cogwheels having different bevel or orientation of the teeth, as illustrated in FIG. 6, with the axial position of the two gears being adjustable with respect to the positions of the gears on the platforms cooperating with them. By this arrangement, axial movement of these idler gears changes the distance between the points of support of the couplers in the supporting disc or second platform and the corresponding blade axes in the wheel body or platform 2, thereby allowing the easy selection of the magnitude of the angular deflection of the blades. The gears 12a and 12b may be mechanically or hydraulically adjusted in the longitudinal direction.

In the illustrated preferred embodiment, either four or six blades 1 are supported in the wheel body or platform 2. The blades 1 are moved by a carrier peg or arm 3, each of which slides in a corresponding crosshead or pivotable link 4. By looking at FIG. 2, one may derive a formula for the blade motion with respect to the tangent to the path of the blade axis:

$$\sin \alpha = \sin \phi \sqrt{\frac{1}{1 + (e/a)^2 + 2(e/a) \cdot \cos \phi}} \; ; e/a = 1/\lambda.$$

Figure 2:
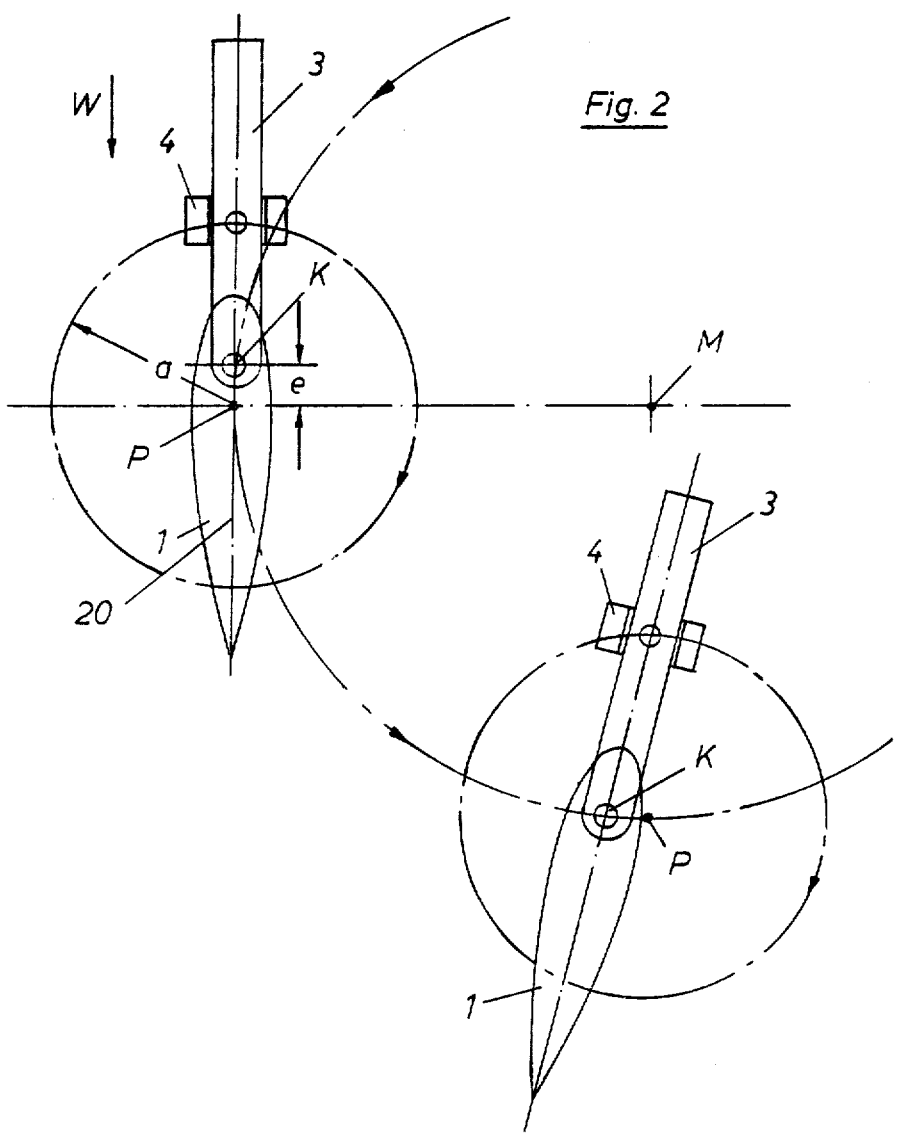
FIG. 2 is a top view along line 2—2 of FIG. 1.

In FIGS. 1 and 2, the distance e represents the adjustable stationary crank of the revolving crank slot, the radius a (the distance of the crosshead 4 from the center of rotation of the coupler 6) is the length of the coupler, and the carrier peg or arm 3 represents the revolving crosshead path of the revolving crank slot. $\alpha$ is the tilting angle of the blade relative to the tangent to the blade circle or path of the blade axis. $\phi$ is the angle of revolution of the blade relative to a conventional reference direction and $\alpha - \phi$ would be the angle of the blade relative to the direction of fluid flow, that is the attack angle.

In FIG. 3, the blade positions which arise for $\lambda = a/e = \infty$ are shown while in FIG. 4 the blade position for $\lambda = 2.5$ are illustrated.

It will be recognized that for the case $\lambda = \infty$, the wind or other fluid flow will not cause the platform to rotate because there is no aerodynamic buoyancy or lift acting on the blades. However, for the case $\infty > a/e > 1$, buoyancy or lift will occur which will turn the rotor, and the angular velocity of the rotor or platform will become greater the smaller the value of $a/e$.

It becomes obvious from FIGS. 1 and 2 that for the desired blade motion to occur, there must be a rotation of the coupler 6 with the crosshead 4 by $-\omega$ inside the supporting disc 9 around the point P. That is, the average angular velocity of the coupler must be the same as the average angular velocity of the platform 2 but in the opposite direction or sense. Additionally, the value e should be adjustable so as to be increased from a starting value of zero up to about $0.8 \times a$ in a continuous fashion. A value of e which is $=a$ is not possible with this constructive arrangement. With this arrangement then all the blades on the wheel body assume the same relative position at corresponding points of the revolution of that body, as is illustrated in FIGS. 3 and 4. The arrows w always signify the direction of the wind or fluid flow while the angle of attack of a blade is the angle between that fluid flow direction and the chord or center line 20 which defines the profile axis of a blade.

FIG. 5 illustrates how the uniform angular positioning is achieved. The coupler 6 is constructed as a sprocket wheel. A chain 5 which passes across all the sprocket wheels of the couplers 6, brings about a uniform angular velocity of all the crossheads 4. An additional chain 7 which passes over a central relatively fixed sprocket wheel 8 and a sprocket wheel of a coupler 6 with the number of teeth of the sprocket wheel 8 and of the sprocket wheel of the coupler 6 being identical, results in the desired angular velocity relative to the wheel body 2 and which has the opposite sign of the angular velocity $\omega$ shown by the wheel body and by the supporting disc or second platform 9. This angular velocity is identical in value for all the couplers 6.

To achieve the desired similar tilting motion of all the blades during a revolution, the axes of rotation K of all blades 1 are turned in the sme direction with respect to the axes of rotation P of the couplers 6. A turning of the point K, for example in the clockwise direction relative to the point P, would result in the positions illustrated in FIG. 2 and the blade positions shown in FIGS. 4 and 5. This brings about a rotation of the whole assembly in the counter-clockwise direction. The construction of an entire windpower installation in principle is illustrated in FIG. 1. The sprocket wheels, that is the couplers 6 of the blades 1, are positioned in a supporting disc or second platform 9. The supporting disc 9 is driven by a synchronous drive made up of a gear 10 which has an internal toothing about the platform 2. The synchronous drive also includes a gear 11 of internal toothing located about the supporting disc or second platform 9, and two gears 12a and 12b which are helical gears mounted on a common shaft 8 and functioning to couple the platforms 2 and 9 together. Thus, the supporting disc 9 revolves with the same angular velocity as the wheel body or platform 2.

As is most easily seen in FIG. 6, the angular position of the supporting disc 9 with respect to the wheel body 2, may be changed by shifting the two helical gears 12a and 12b in the axial direction. This change in relative angular position is, of course, due to different pitches on the two helical gears, and which is illustrated as different senses or orientations of the teeth of those gears. Because the bearing of these two gears is rigidly placed upon the foundation or pedestal of the device, the required axial shifting is brought about mechanically or hydraulically in a simple manner. As has been illustrated here, the axial displacement may occur under the action of a lifting piston 16. In this manner, a certain distance becomes adjusted between the center of rotation P of the coupler and the blade axis K under consideration and in this way the magnitude of the angular deflections of the blades is determined.

Due to this shifting, one may change the angular velocity of the wheel body 2 and the power harnessed. If necessary, regulators may be installed which affect these parameters according to the wind velocity to achieve different settings.

To compensate for changes in wind or flow direction, it should be possible to adjust the blades 1 so that they point with the leading blade edge into the wind or flow and are thereby able to execute the desired tilting motions relative to the wind or fluid flow direction. This adjustment is achieved by turning the central sprocket wheel 8 under the action of a worm drive 13. This turning by way of the chain 7 causes a corresponding turning of each of the blades. Of course, the chain 7, like the chain 5, may engage the sprocket wheel of the coupler 6 of the blade or may engage another wheel provided in addition which is rigidly connected (immovably with respect to it) to the coupler 6.

The output of the wheel body or platform 2, by way of a drive gearing arrangement 14, may be passed on to a generator 15 for producing electrical energy, thereby harnessing the natural energy of the fluid stream.

From the foregoing it is now apparent that a novel device for harnessing the energy of a fluid stream has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A device for harnessing the energy of a fluid stream comprising:
   a platform rotatably supported on a central axis;
   a plurality of vanes supported on the platform for rotation about respective vane axes generally parallel to and displaced from the central axis;
   means for synchronizing vane rotation about the respective vane axes relative to platform rotation about the central axis to provide each vane with the same average angular velocity as the platform including a second platform rotatable in the unison with the said platform and supporting means coupling the second platform to respective vanes, the angular velocity of each vane about its axis exceeding the angular velocity of the platform during half of each platform revolution and being less than the platform angular velocity during the other half of each platform revolution.

2. The device of claim 1 further comprising means for adjustably controlling the amount of dissimilarity between the vane and platform angular velocities.

3. The device of claim 1 wherein each vane has a chord aligned with the direction of fluid flow when the line joining the central axis and that vane axis is generally perpendicular to the direction of fluid flow, the vanes when positioned downstream of the line through the central axis perpendicular to the direction of fluid flow having their chords inclined to the flow direction in one sense while the vanes when positioned upstream of that line have their chords inclined to the flow diameter in an opposite sense.

4. The device of claim 3 wherein the maximum inclination of a vane chord relative to the flow direction is limited so that a line perpendicular to that chord at the vane axis always intersects the line perpendicular to fluid flow through the central axis outside the circular path of that vane axis about the central axis.

5. The device of claim 2 wherein, the means for adjustably controlling comprising means for modifying the angular relationship between the said platform and second platform.

6. In a device for converting the kinetic energy of a fluid stream into useful work having a platform rotatably supported on a central axis and in turn supporting a plurality of blades each rotatable about a respective blade axis generally parallel to and displaced from the central axis to vary the angle of attack between the blades and the fluid stream during each revolution of the platform, the improvement comprising:

means coupling the blades together so that each blade executes a similar motion during each revolution of the platform, the fluid stream angle of attack relative to a given blade being substantially zero when the fluid stream is directed normal to the plane including the central axis and the given blade axis, and means for varying the amount of variation in blade angle of attack during each revolution of the platform, wherein the coupling means comprises a second platform rotatable about the central axis in unison with the said platform, which second platform has radially distributed thereabout a plurality of wheels each coupled to one respective blade, the wheels being in unison with the platforms relative to them rotatably supported on the second platform about axes alignable respectively with corresponding blade axes and rotatable with the same angular speed as that of the platforms but in the opposite sense, the means for varying including means for modifying the angular relationship between the second platform and the said platform, thereby generating a distance "e" between the axes of the blades and those of the respective wheels, wherein further respective wheels and blades are pivotally coupled together at points removed from the sprocket axis a fixed distance and from the blade axis a variable distance, and when the means for modifying has positioned a blade axis the distance "e" from its corresponding sprocket wheel axis, the distance between the pivotal coupling point and the blade axis varies from the sum of the fixed distance and "e" to the fixed distance less "e" once during each revolution of the platform.

7. The improvement of claim 6 wherein the platform and second platform are synchronized to rotate in unison by a pair of coaxial helical idler gears of like pitch but having opposite sense whereby rotation of the idler gear pair synchronizes the platforms while axial movement of the idler gear pair modifies the angular relationship between the platforms.

8. The improvement of claim 1 further comprising means including a central wheel for coupling all of the wheels together to execute one complete revolution about their respective axes for one complete revolution of the platform about the central axis.

9. The improvement of claim 8 further comprising means for turning the central wheel and therefore also each of the wheels to properly align the blades with respect to the direction of flow of the fluid stream so that in the case that the axes of the wheels are aligned with those of the respective blades all of the blades are aligned with the direction of flow of the fluid stream.

* * * * *